Aug. 11, 1959

N. V. GUSCHING ET AL 2,898,891

HYDRAULIC FLOW CONTROL

Filed Feb. 13, 1956

INVENTORS
NAGLE V. GUSCHING
RICHARD J. FLANIGAN

BY Cushman, Darby & Cushman
ATTORNEYS

Aug. 11, 1959         N. V. GUSCHING ET AL         2,898,891
                       HYDRAULIC FLOW CONTROL
Filed Feb. 13, 1956                              4 Sheets-Sheet 4

INVENTORS
NAGLE V. GUSCHING
RICHARD J. FLANIGAN

BY *Cushman, Darby & Cushman*
                          ATTORNEYS

United States Patent Office 2,898,891
Patented Aug. 11, 1959

2,898,891

HYDRAULIC FLOW CONTROL

Nagle V. Gusching, Sidney, and Richard J. Flanigan, Kettering, Ohio, assignors to The Monarch Machine Tool Co., Sidney, Ohio, a corporation of Ohio Application February 13, 1956, Serial No. 565,182

14 Claims. (Cl. 121—45)

This invention relates to fluid systems or circuits and more particularly to a hydraulic circuit including a piloted valve for controlling a fluid motor or the like.

It is an object of the present invention to provide a hydraulic system including a balance valve for controlling the rate of movement of a fluid motor or the like and means for piloting the balance valve so as to control the movement of the motor in accordance with the movement of the balance valve effected by the pilot means.

Another object of the present invention is the provision of a hydraulic circuit including a balance valve and a tracer valve for controlling the operation of the balance valve, and means for varying the effect of the tracer valve on the balance valve.

A further object of the present invention is the provision of a hydraulic circuit including a hydraulic motor, a balance valve for controlling the movement of the motor and a tracer valve connected with the balance valve in such a way that the motor can be reversibly controlled.

A still further object of the present invention is the provision of a hydraulic system including a tracer valve for controlling the operation of a balance valve, and means for connecting the valves together in such a manner that the balance valve is operable to control the rate of movement of a motor connected in the system so that the rate is substantially constant over a large range of motor load.

A still further object of the present invention is the provision of a novel hydraulic circuit for controlling the movement of a hydraulic motor or the like in accordance with a piloting means, which circuit is simple, but versatile in its operation.

These and other objects of the present invention will become more apparent during the course of the following detailed description and appended claims.

The invention may best be understood with reference to the drawings wherein an illustrative embodiment of the invention is shown.

Figure 1:
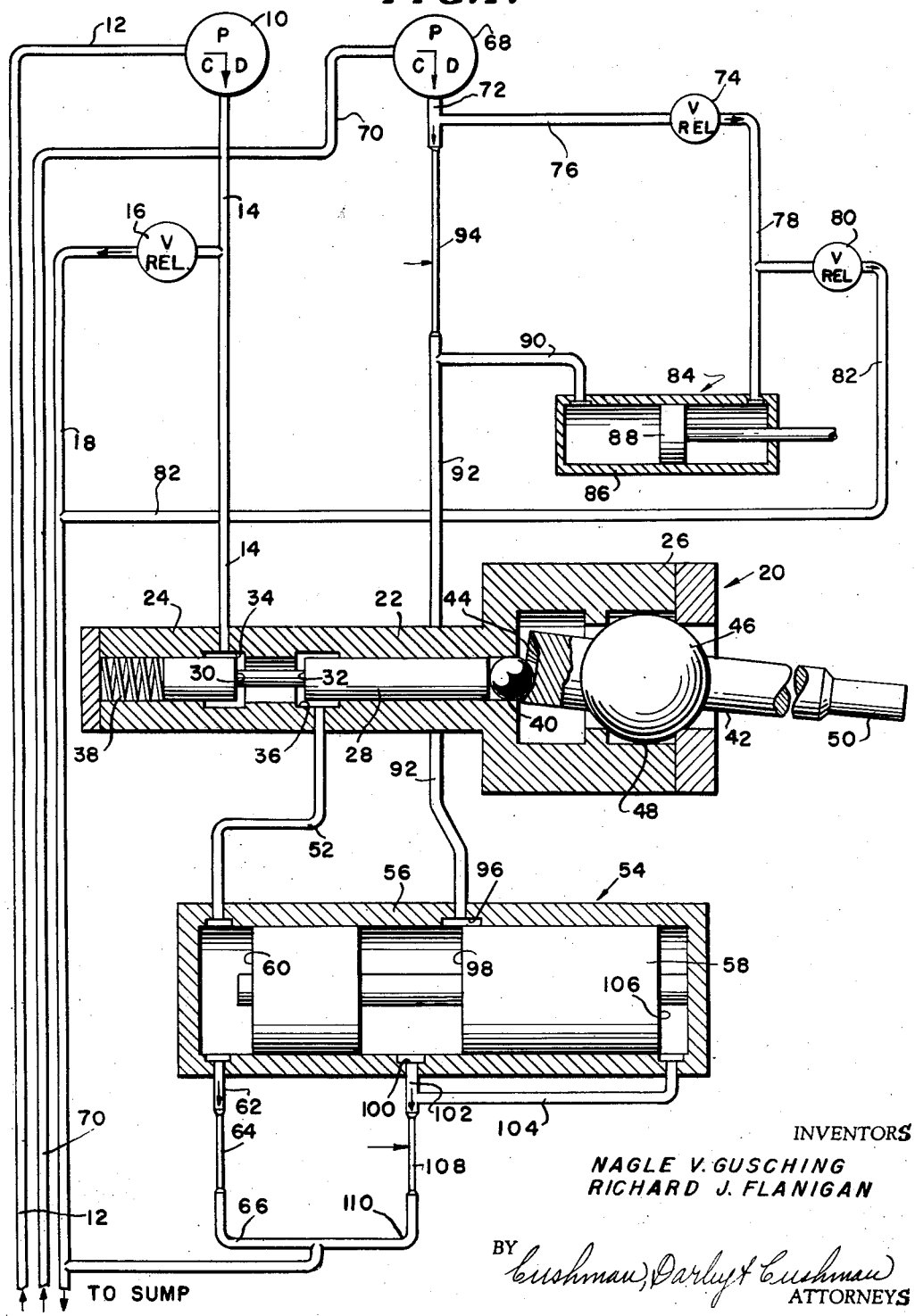
Figure 1 is a schematic diagram of one form of a hydraulic circuit embodying the principles of the present invention.

Referring now to Figure 1, there is shown a constant volume pump 10 which draws oil or other fluid from a sump through a suction line 12 and which discharges into a line 14. The pressure in line 14 is controlled by a relief valve 16 which discharges excess oil back to the sump through line 18. Line 14 is thus at substantially constant pressure and discharges into a tracer valve, generally indicated at 20.

The tracer valve includes a valve body 22 having a spool-receiving portion 24 and a tracer arm receiving portion 26. A valve spool 28 is slidably mounted within the portion 24 and has a groove formed therein which defines a pair of lands 30 and 32. Formed in the valve body adjacent land 30 is a port 34 which is connected with the line 14. A second port 36 is formed in the valve body adjacent the land 32 and communicates with the port 34 due to the groove formation in the spool. Interposed between one end of the spool and the adjacent end of the valve body is a coil spring 38 which acts to bias the spool to the right, as viewed in Figure 1. A small ball 40 is mounted for sliding movement with the spool at the opposite end thereof and a tracer arm 42 has a recess 44 formed in one end thereof which engages the ball in the opposite direction. Tracer arm 42 is mounted within the portion 26 of the valve body for universal rocking movement, as by a ball and socket joint formed by a spherical enlargement 46 intermediate the ends of the arm 42 and a cooperating complementary socket 48 formed in the body portion 26. The outer end of the tracer arm 42 terminates in a tracer finger 50 which is adapted to follow the contours of a template (not shown).

The fluid entering the tracer valve 20 through line 14 discharges from the port 36 of the valve through a line 52 connected with a balance valve 54. The balance valve includes a valve body 56 having a spool 58 slidably mounted therein. One end of the spool includes a pressure area 60 which together with the adjacent end of the valve body defines a space into which the fluid in line 52 discharges. Another line 62 leads from this space to one end of a fluid resistance 64. The opposite end of the resistance 64 discharges into the sump through a line 66.

A second pump 68, also designed to give a constant volume displacement, is provided to draw oil from the sump through a line 70 and to discharge into a line 72. The pressure in this line is maintained relatively constant by means of a relief valve 74 which is connected to a branch line 76 from the line 72. The relief valve 74 discharges into a line 78 which is held at a relatively constant pressure lower than that in line 72 by means of a second relief valve 80 which discharges into the sump through a line 82. Line 78 is connected to one side of a fluid motor, generally indicated at 84, which preferably comprises a cylinder 86 connected at one end to the line 78 and a piston and piston rod assembly 88 slidably mounted within the cylinder. The opposite end of the cylinder is connected with one end of a line 90, the opposite end of which is connected to a line 92. A fluid resistance 94 is connected between the line 92 and the discharge line 72 from the pump 68. Line 92 discharges into a port 96 formed in the body of the balance valve 54. The balance valve spool 58 is grooved to define a land 98 disposed adjacent the port 96 and a second port 100 is formed in the valve body through which the fluid entering the port 96 may discharge through the valve. A line 102 leads from the port 100 and has a branch line 104 communicating with a space defined by the opposite end of the casing and a pressure area 106 formed on the adjacent end of the spool. A fluid resistance 108 is connected with the line 102 and discharges to the sump through a line 110.

Figure 4:
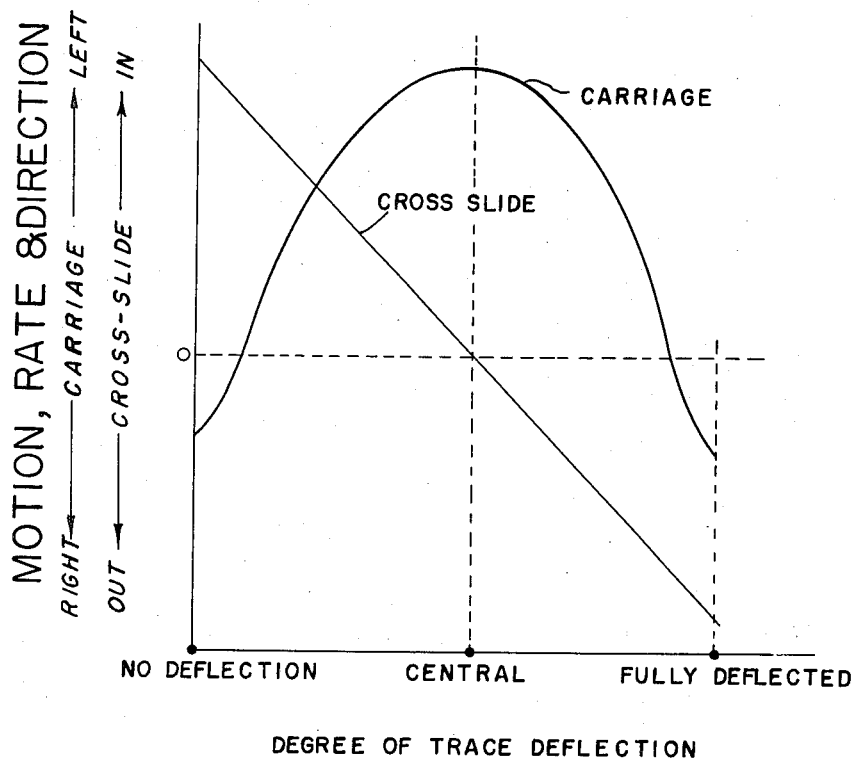
Figure 4 is a chart illustrating the direction and rate of motion of the two hydraulic motors in Figure 3, in accordance with the degree of deflection of the tracer finger.

In the operation of the circuit disclosed in Figure 1, the pump 10 discharges into line 14 and due to the presence of relief valve 16, the fluid entering the tracer valve 20 will be under a substantially constant pressure. The tracer valve and its associated circuit comprises a pilot means for controlling the movement of the balance valve, which in turn controls the movement of the hydraulic motor 84. It will be understood that this pilot means serves to impress varying pressures upon the pressure area 60 of the balance valve spool so as to control the operation of the same. Therefore, there may be a large variety of conditions which the pilot means senses in order to impose a varying pressure on the area 60. In the embodiment shown in Figure 1, the pilot means is exemplified by a tracer valve which may form a part of a machine tool. Briefly, the tracer finger is arranged to be moved in accordance with the change in contour of a template and the movement of the tracer finger in turn ultimately controls the movement of the motor which moves the tracer body relative to the tempate and the tool relative to the workpiece. The tracer valve 20 illustrated is operable to impose a variable resistance in series in the fluid circuit leading to the pressure area 60. It can be seen that the spring 38 constantly urges ball 40 to the right and into the recess 44 so that the tracer arm 42 is axially aligned with the valve spool 28; that is, the tracer arm is urged into a normally non-deflected position wherein land 30 substantially closes port 34. Likewise, it will be seen that when the arm 42 is deflected to an extreme angularly deflected position as by engagement of the finger 50 with the template, the valve spool 28 will be moved to an extreme far left position, as viewed in Figure 1 wherein land 32 substantially closes port 36. Intermediate these two positions of the valve spool 28, that is, non-deflected and fully deflected positions, there is a position which conveniently may be termed a central position. This central position of the valve spool is illustrated in Figure 1. It will be noted that the lands 30 and 32 equally restrict the ports 34 and 36 so that a maximum flow therethrough is permitted at the central position. If the spool is moved in either direction, as by moving the tracer arm toward either its non-deflected or fully deflected position, either one or the other of the lands will move into a position in which the flow through the adjacent port is restricted to a greater degree. Therefore, the flow through the tracer valve will be less as the tracer arm is moved either toward its non-deflected position or its fully deflected position. As will be more fully explained hereinafter, this operation of the tracer valve results in an operation of the hydraulic motor which may be illustrated as an inverted U-shaped curve when the deflection of the tracer arm is plotted against the speed and direction of movement of the motor, as shown in Figure 4. In some cases it may be desirable to have the resistance in the tracer valve to continually increase or decrease with deflection, in which case one or the othehr of lands 30 or 32 can be removed from spool 28.

From the above, it can be seen that with the tracer arm of the valve 20 in its central position, as shown, the resistance to flow from the pump 10 through the valve and into the line 52 is relatively small. Since the fluid is free to flow through the balance valve and into line 62, the flow in line 62 will be substantially the same as that through the tracer valve. With little pressure drop across the tracer valve, there will be a high pressure in line 62 and a high pressure drop across the resistance 64. This high pressure is transmitted to the pressure area 60 tending to move the balance valve spool 58 to the right, as shown in Figure 1. With the spool moved to the right, the land 98 restricts the flow of fluid through the port 96 to a lesser degree and the greater the flow through port 100, which in turn results in a higher pressure drop across fluid resistance 108. Thus, the pressure in line 102 will be relatively high and this pressure is impressed upon the pressure area 106, which opposes the area 60. Thus, these two pressures are always equalized by movement of spool 58 and the balance valve will be maintained in a stable condition. With the tracer valve in its central position, the balance valve will be maintained in the position shown in Figure 1 wherein land 98 permits relatively large flow through the port 96 and consequent relatively high motor speed. If the motor load increases, the flow through line 92 would tend to decrease, but spool 58 would shift to the right to maintain the motor speed. With less resistance to the flow through port 96, the pressure in lines 90 and 92 will be lower than the pressure maintained in line 78 by virtue of the relief valves 74 and 80 and, therefore, the piston and piston rod assembly 88 will travel toward the left, as viewed in Figure 1, at a maximum rate when the tracer valve is in its central position.

As noted above, movement of the tracer arm in either direction from the central position results in a reduction in the pressure applied to the area 60 and, hence, the balance valve spool 58 will tend to move to the left to equalize forces. This movement of the spool causes the land 98 to restrict the flow through port 96 until the pressure imposed upon the area 106 equals the pressure on the area 60. With more restriction to flow through the port 96, there is less flow through the lines 90 and 92 and, hence, a slower rate of movement of the piston rod and piston assembly 88. With the tracer arm in a position on either side of the central position which results in a pressure on the area 60 corresponding to a spool position in which the land 98 restricts the port sufficiently to permit flow therethrough equal to the flow through resistance 94, movement of the piston within the cylinder will stop. Further decrease in the pressure acting on area 60 by further movement of the tracer arm will result in a further restriction of the flow through port 96, which in turn will require that some of the flow through resistance 94 go through line 90 and result in the movement of the piston in the opposite direction or toward the right, as viewed in Figure 1, with discharge to the sump through relief valve 80. Figure 4 clearly illustrates the movement of the piston with respect to the cylinder which corresponds to the various positions of deflection of the tracer arm. It will be noted, that the greatest velocity or rate of movement of the piston forward occurs when the tracer arm is in its central position and that greatest rate of movement in the opposite direction occurs when the tracer arm is in its non-deflected position or its fully deflected position.

It can thus be seen that the tracer valve 20 regulates the flow of fluid from pump 10 to resistance 64. Since resistance 64 discharges to the sump, the tracer controlled flow provides a particular pressure on the area 60 for each tracer valve position. If area 60 is equal to area 106 and resistance 64 is equal to resistance 108 the spool 58 shifts to make the flow through resistance 108 equal to that through resistance 64 for then the respective upstream pressures are equal. In some usage it may be desirable to make area 60 larger than area 106 or make resistance 64 larger than resistance 108 or both so that the flow through the tracer circuit need not equal the flow through the motor circuit. In other cases the areas and resistances may be arranged the other way to meet other needs.

In view of the fact that the resistance to flow through variable resistance 94 is at least several times greater than the resistance to flow through relief valve 74 and motor 84, even when the motor is at rated full load, the flow through resistance 94 is only a fraction of the flow through resistance 108 so when load is applied to the motor 84 and the spool 58 shifts to maintain the flow through resistance 108, the motor speed is maintained substantially constant. As noted above, when the flow through resistance 64 is decreased to equal the flow through resistance 94 and the resistances 64 and 108 and areas 60 and 106 are equal, motor 84 is stopped. When flow through resistance 94 exceeds the flow through resistance 108, the motor 84 reverses. If it is desired that the maximum motor rate is variable, the resistances 94 and 108 are made variable for control of maximum motor speeds in both directions.

While the provision of the pressure area 106 renders the balance valve self-balancing through hydraulic forces, it will be understood that the pressure applied by the tracer valve circuit could be assisted by a spring, if desired. Moreover, with the arrangement shown, the movement of the spool in response to variation in pressure on the area 60 is such as to attempt to keep the pressure on area 106 equal to the impressed pressure. If the resistances 64 and 108 are of equal value and areas 60 and 106 are equal, then the flows to the sump will be equal, but if they are of different proportions, the flows to the sump through the resistance become inversely proportionate to the resistances. In this manner, the tracer circuit may be kept to a modest size and yet control a power circuit of substantial size. It will be understood that a single pump may be utilized instead of the two pumps 10 and 68, shown. In that case, suitable means must be utilized to prevent changes in the power circuit due to loads from influencing the flow in the tracer circuit for best results. It will also be understood that instead of the cylinder and piston type hydraulic motor, a rotary motor or other fluid device may be utilized, if desired. Moreover, a spring or weight system could be utilized in lieu of the constant hydraulic pressure applied through the line 78.

Figure 2:
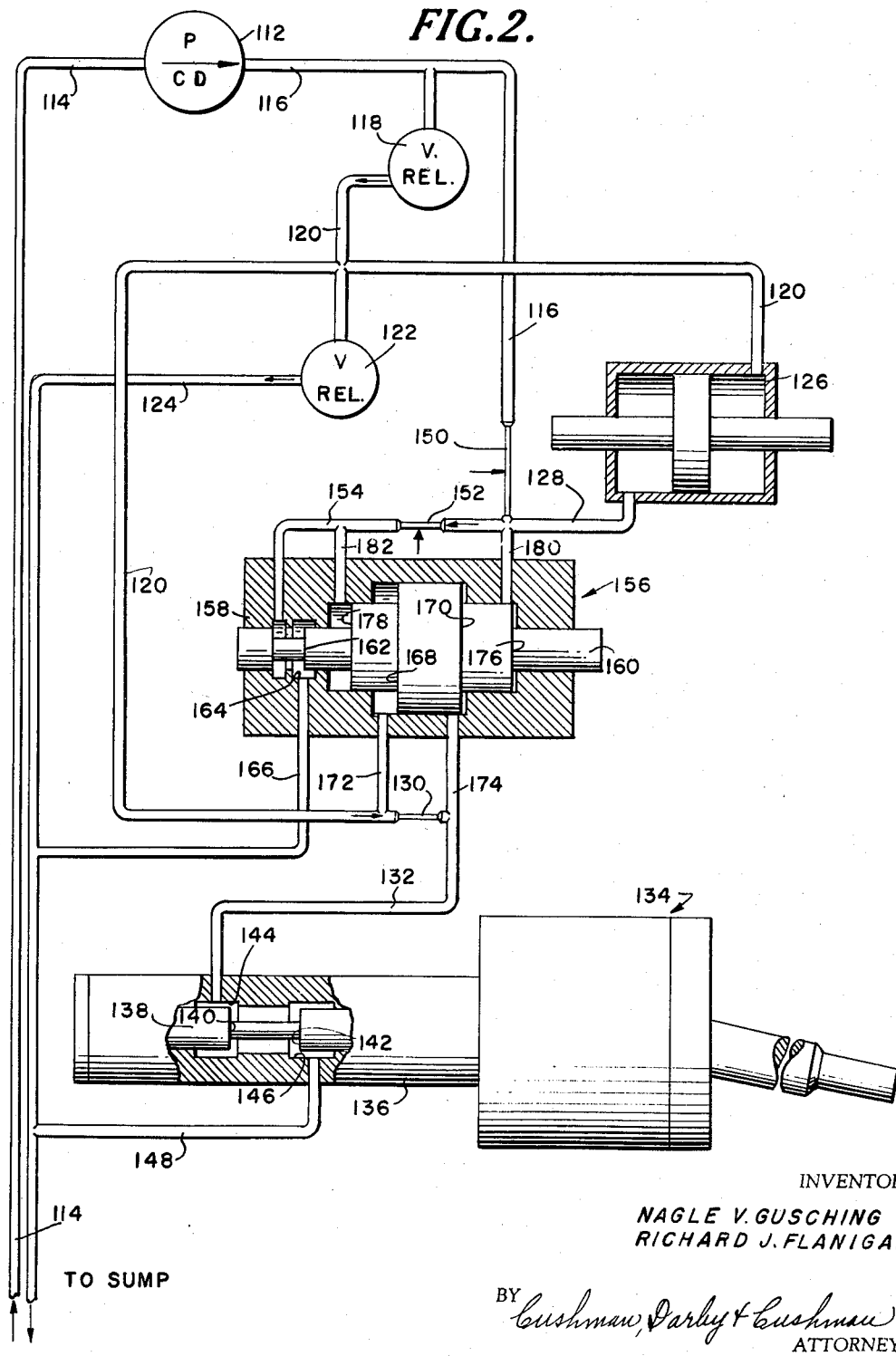
Figure 2 is a schematic diagram of another form of a hydraulic circuit embodying the principles of the present invention.

Referring now to Figure 2, there is shown another modification of the present invention in which the circuit includes a pump 112 of constant volume characteristics operable to draw oil from a sump through a line 114 and discharge into a line 116. The pressure in line 116 is maintained substantially constant by means of a relief valve 118 which discharges into a line 120. The pressure in line 120 is in turn maintained at a lower constant pressure by means of a second relief valve 122, which discharges into the sump through a line 124. A fluid motor 126, preferably in the form of a cylinder and piston, is connected at one side with the line 120 and has a line 128 leading from its other side.

Line 120 is also connected to one end of a control fluid resistance 130, the other end of which is connected through a line 132 to a tracer valve 134 constructed similar to the tracer valve 20 previously described. Briefly, the tracer valve 134 includes a valve body 136 having a spool 138 slidably mounted therein. The spool is provided with a pair of lands 140 and 142 disposed respectively adjacent a pair of ports 144 and 146 formed in the valve body, the lands being operable to control the flow of fluid through the ports. A line 148 is connected with the port 146 so as to permit the fluid flowing through the tracer valve to empty into the sump. Line 116 discharges into a fluid resistance 150 which is connected to the line 128 leading from the fluid motor 126. Line 128 at the other side of resistance 150 discharges into a second control resistance 152, the other end of which is connected through a line 154 to a balance valve 156 of a modified construction.

The balance valve 156 includes a valve body 158 having a spool 160 slidably mounted therein, one end of which is grooved to form a land 162 disposed adjacent a port 164 formed in the valve body. Line 154 discharges into the valve body adjacent the grooved portion of the spool and land 162 controls the flow through the port 164. A line 166 leads from the port 164 to the sump. The valve spool 160 also includes a central portion of enlarged diameter which provides a pair of opposed pressure areas 168 and 170. These areas together with the adjacent portion of the valve body define two pressure spaces which are connected with the high and low sides of the resistance 130 through lines 172 and 174, respectively. Disposed on the valve spool adjacent each of the areas 168 and 170 is an enlarged portion of intermediate diameter which provides respective opposed pressure areas 176 and 178. These areas together with the adjacent portion of the valve body define a pair of pressure spaces which are connected to the high and low pressure sides of the resistance 152 through lines 180 and 182, respectively.

In the operation of the circuit of Figure 2, it can be seen that pump 112 delivers fluid to the line 120, which is maintained at a substantially constant pressure by means of the relief valves 118 and 122. This constant pressure is connected to one side of the hydraulic motor and tends to move the piston thereof toward the left, as viewed in Figure 2. In addition, the fluid in the line 120 flows across control resistance 130, which creates a pressure drop in the line. Thus, line 172 will transmit a greater fluid pressure to the area 168 than will the line 174 to the area 170. The combined effect of the pressures acting on the areas 168 and 170 tends to move the balance valve spool to the right, as viewed in Figure 2. However, since the line 132 is connected in series with the tracer valve, when the latter is in its central position, resistance to flow through the tracer valve 134 is at a minimum, as previously noted, and, therefore, the pressure drops across resistance 130 and the resulting forces on areas 168 and 170 urging spool 160 to the right are at a maximum.

Consequently, with the tracer valve in a central position, the balance valve spool will be urged toward its extreme right-hand position wherein the land 162 provides a minimum restriction to flow through the port 164. With a maximum of flow through the port 164, there will be a maximum pressure drop across resistance 152 and the resulting forces on areas 176 and 178 will urge spool 160 to the left with maximum force. Moreover, with high flow through resistance 152, the flow in line 128 will likewise be relatively high so that the piston of the hydraulic motor will move at a maximum rate to the left, as viewed in Figure 2. When the tracer arm is moved in either direction away from the central position, a greater restriction to flow through the valve results and, hence, there is a lower flow through resistance 130 and thus less pressure drop thereacross urging spool 160 to the right. Movement of spool 160 to the left causes the land 162 to restrict the flow of fluid through the port 164, which in turn decreases the pressure drop across the resistance 152, and motor 126 will move at a reduced speed. The pressure in line 154 is transmitted to the area 178 through line 182 and the pressure in line 128 is transmitted to area 176 through line 180 so that movement of the valve spool will continue as a result of the change in position of the tracer arm until a balance of forces is obtained.

It is thus seen that the tracer valve 136 controls the amount of fluid flowing from constant pressure line 120 through line 148 to the sump. Resistance 130 measures this flow and the pressure drop thereacross is communicated to areas 168 and 170 and the balance valve spool 160. If all of the spool areas 168, 170, 176 and 178 are equal, and resistances 130 and 152 are equal, it can easily be seen that the flow through and pressure drop across resistance 152 must be equal to these conditions for resistance 130. If they are not equal, the forces on spool 160 will not be balanced and the spool 160 will move to regulate the land-port combination 162—164 to adjust the flow through resistance 152 so that the forces are balanced.

Thus, with the flow through resistance 152 held constant for any particular tracer deflection, it can be seen that at relatively high flows the speed of motor 126 is substantially constant. As tracer deflection reduces the flow through resistance 130, and consequently resistance 152, the speed of motor 126 decreases until the flow through resistance 152 equals the flow through resistance 150 and the motor stops. When the flow through resistance 152 is decreased to below the flow through resistance 150, the excess flow from resistance 150 causes the motor 126 to reverse.

During forward motion of motor 126 it has been noted that the flow is maintained constant through resistance 152 for any particular tracer deflection. Since this constancy is maintained, any change of load on the motor 126 will not substantially change the motor speed for spool 160 will shift to keep the motor speed substantially constant. As described, the areas 168 and 170 and 176 and 178 are equal and the resistances 130 and 152 are equal. If it is desired that the flow through the tracer be less than the flow through the motor, resistance 130 can be of higher value than resistance 152. Similarly the areas 168 and 170 could be made larger than the areas 176 and 178 for the same purpose. Other needs might require the opposite arrangement of values. Resistances 150 and 152 are made variable so that the maximum rates of the motor 126 in each direction can be limited.

As with the circuit shown in Figure 1, the tracer valve 134 is such that a chart of tracer arm deflections against speed and direction of hydraulic motor movement produces an inverted U-shaped curve. Thus, as the movement of the tracer arm away from the central position in either direction increases, the flow through resistance 130 thereby reduces causing spool 160 to shift to the left as shown in Figure 2 to decrease the flow through resistance 152 by an increased restriction of port 164 by land 162 such that the forces on the spool 160 pressure areas are again balanced. When the flow through resistance 152 is equal to the flow through resistance 150, no further movement of the motor will occur. Further movement of the tracer arm away from the central position will result in the reduction of flow through resistance 152 and, hence, the motor will move in the opposite direction or toward the right, as viewed in Figure 2. Of course, a tracer which results in a different curve of flow rate versus deflection could be used as is described hereinafter.

It can be seen that a rotary motor may be readily used instead of the piston and cylinder type motor illustrated at 126 for it is the requirements of the drive that determine the physical structure of the motor. Furthermore, resistances 130 and 152 may be of any reasonable values for the structure desired and they need not be equal. The areas 168 and 170 and 176 and 178 need not be equal and these may be adjusted to provide the desired proportionality. While the circuit shown in Figure 2 is similar to that shown in Figure 1, the former presents the advantage that equipment may be placed in the line after the balance valve as well as before as shown.

Figure 3:
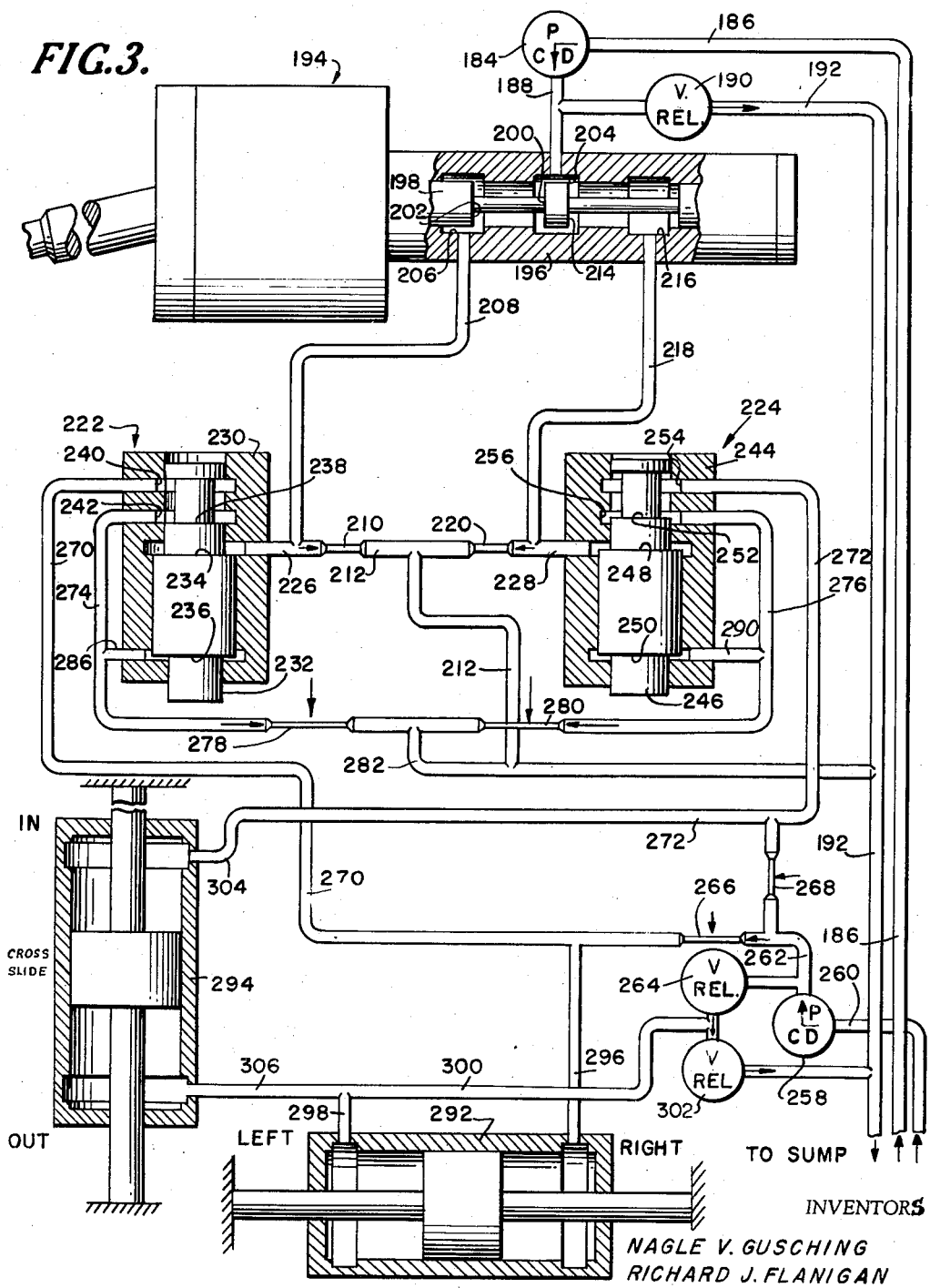
Figure 3 is a view similar to Figures 1 and 2 illustrating still another embodiment of the circuit.

Referring now more particularly to Figure 3, there is shown a system embodying a power circuit having dual valves and motors, such as disclosed in Figure 1, piloted by a single tracer circuit. The tracer circuit includes a pump 184 which draws fluid from a sump through line 186 and discharges into a line 188, which is kept at a substantially constant pressure by means of a relief valve 190 discharging to the drain through a line 192. The line 188 discharges into a tracer valve 194 which is generally constructed similar to the tracer valve 20, illustrated in Figure 1. Thus, the valve 194 includes a valve body 196 having a valve spool 198 slidably mounted therein and grooved to define a pair of lands 200 and 202. The valve body is provided with ports 204 and 206 disposed adjacent the respective lands 200 and 202. The main constant pressure line 188 discharges into the port 204 past the lands 200 and 202 and through the port 206 into a line 208 having a fluid resistance 210 connected therewith. The opposite end of the resistance 210 discharges into the sump through a line 212.

The structure described above corresponds with the structure previously described in connection with the tracer valve 20 in Figure 1. However, the tracer valve 194 of the present embodiment is grooved at a second position to define another land 214 disposed adjacent the port 204. An additional port 216 is formed in the valve body adjacent the grooved portion of the spool to receive fluid flowing through the port 204 past land 214. A line 218 is connected with the port 216 and leads to a second fluid resistance 220, which also discharges to the sump through the line 212.

The high pressure side of the resistances 210 and 220 are connected respectively to a pair of balance valves 222 and 224 through lines 226 and 228, respectively. Balance valve 222 includes a valve body 230 having a valve spool 232 slidably mounted therein. The valve spool includes an enlarged central portion defining a pair of opposed pressure areas 234 and 236 which together with the surrounding portion of the valve body define pressure spaces. The spool 232 is also grooved to provide a land 238 and the valve body is formed with a pair of ports 240 and 242, the latter of which is disposed adjacent the land 238. The balance valve 224 is identical in construction with the balance valve 222 and includes a body 244, spool 246, pressure areas 248 and 250, land 252 and ports 254 and 256.

As in the circuit of Figure 1, the balance valves 222 and 224 are connected in a power circuit including a pump 258 operable to draw fluid from a sump through line 260 and discharge the same into a line 262, which is maintained at a substantially constant pressure by means of a relief valve 264. Connected in parallel with the line 262 are a pair of fluid resistances 266 and 268, which in turn are connected to the ports 240 and 254 of the balance valves 222 and 224 through lines 270 and 272, respectively. The flow through ports 242 and 256 discharges into lines 274 and 276, respectively, having fluid resistances 278 and 280, respectively connected thereto. Resistances 266, 268, 278 and 280 are preferably variable for a purpose hereinafter to be more fully described. The flow through resistances 278 and 280 discharge into the sump through a line 282.

The pressure areas 234 and 236 of the balance valve 222 are connected respectively to the high pressure side of the tracer circuit resistance 210 through line 226 and to the line 274 through a line 286. Likewise, the areas 248 and 250 of the balance valve 224 are connected respectively with the high pressure side of the resistance 220 through a line 228 and to line 276 through a line 290.

The power circuit also includes a pair of hydraulic motors 292 and 294, preferably of the cylinder and piston type, which may be arranged for movement in directions perpendicular to each other. One side of the motor 292 is connected through a line 296 to line 270 and the other side thereof is connected through a line 298, which in turn is connected through a line 300 to the discharge side of the relief valve 264. The pressure in line 300 is maintained substantially constant by means of a second relief valve 302, which discharges to the sump. The motor 294 is connected at one end through a line 304 to line 272 and at its other end to the line 300 through a line 306.

In the operation of the circuit of Figure 3, it will be noted that the portion of the circuit relating to each hydraulic motor and associated balance valve corresponds to the circuit of Figure 1. Both of the hydraulic motors are connected in parallel with a single source of hydraulic pressure, and, in addition, a single source of pressure serves to feed each branch of the tracer circuit controlling the balance valves. The operation of the portion of the circuit which includes the motor 292, balance valve 222, resistances 210, 266 and 278, line 208, ports 204 and 206 and lands 200 and 202 of the tracer circuit is substantially identical to the operation of the circuit shown in Figure 1. The remaining portion of the circuit of Figure 3, which includes motor 294 and balance valve 224, also operates in the same manner. However, the tracer circuit controlling balance valve 224 varies somewhat from the tracer circuits heretofore described. It will be noted that the tracer valve circuit to the balance valve 224 is from the pump 184 through line 188, into port 204, past land 214, out port 216, through line 218 and across resistance 220. The high pressure side of the resistance 220 is impressed upon the area 248 to signal tracer deflection to the balance valve. Referring now to Figure 4, it will be seen that the tracer arm deflection-motor velocity and direction curve resulting from the tracer circuit to balance valve 224 is a diagonal straight line in which greater the movement of the tracer arm away from its central position, the greater the speed of the motor, the direction of the motor being dependent upon the direction in which tracer arm is away from the central position; that is, toward the non-deflection position or the fully deflected position. With the tracer arm in its central position, it will be seen that the land 214 is in its mid-point with respect to the port 204 and, hence, permits flow therethrough of a moderate amount. This flow passes through the resistance 220 which creates a pressure on the area 248 and the valve spool 246 is urged downward toward a position permitting a moderate flow through ports 254 and 256 past land 252. This amount of flow past the land creates a pressure drop through resistance 280 which causes a force on area 250 to balance the valve 246. In this case, the flow through reverse resistance 268 is equal to the flow through resistance 280 and consequently, no movement of the motor 294 will occur when the tracer valve is in its central position. When the valve is moved toward its non-deflected position, tracer spool 198 will shift to the left, as viewed in Figure 3, which moves the land 214 into wider relationship to the port 204 permitting a greater flow therethrough to the port 216 and line 218. With a greater flow, through resistance 220 a higher pressure is built up in line 228, which pressure is transmitted to the area 248 urging a movement of the balance valve spool 246. Movement of the spool moves the land 252 into a wider open relation with respect to the port 256, thus, permitting greater flow through the balance valve from the line 272 and through resistance 280 which creates a pressure drop and the pressure acts on area 250 to balance the valve. Since the flow through resistance 280 is greater than the flow through resistance 268, the balance is made up of flow through motor 294 which will move in a downward direction, as viewed in Figure 3.

When the tracer arm is moved away from the central position toward a more deflected position, spool 198 will be shifted to the right, as viewed in Figure 3, which causes the land 214 to narrow the restriction to flow through port 204 and port 216. With less flow in the line 218, the pressure therein will decrease and this decrease in pressure will be transmitted to the area 248 tending to cause the balance valve spool 246 to shift. This movement of the balance valve spool moves the land 252 into a position to more narrowly restrict the flow past port 256 with resultant less flow through resistance 280 which causes force balance on the spool 246. With a greater restriction to flow past the land, the flow in line 272 decreases below the amount of flow through resistance 268. The excess of flow through resistance 268 over the flow in line 272 by-passes through line 304 and, therefore, movement of the motor 294 in a direction upwardly, as viewed in Figure 3, will occur. From the above, it follows that the maximum velocity of movement in the up direction will occur when the tracer arm is in its fully deflected position and that the maximum velocity movement in the opposite direction will occur when the tracer arm is in its non-deflected position. As mentioned at the outset, no motion occurs when the tracer arm is in its central position.

The circuit disclosed in Figure 3 is particularly adapted for use in machine tools of the type wherein the motor 292 controls the tool carriage and the motor 294 controls the cross slide. Referring to Figure 4, it can be seen that movement of the tracer arm, as by means of a template moving into contact with the tracer finger, can be made to impart virtually any direction of motion to the tool. Of particular significance in this regard is that the circuit is quite versatile in that by varying the resistances 266 and 278, the maximum velocity of the carriage when the tracer arm is in its central position can be reduced. It will be seen that by increasing the resistance 278, a greater pressure drop across its line will result and, hence, less flow therethrough will be required to cause a pressure to act against the area 236 to oppose the pressure of the tracer circuit against the area 234. Therefore, restriction to flow through the balance valve will be greater and, hence, the maximum rate of movement of the motor will be less. In this manner, a family of curves for the motor 292 may be obtained merely by varying the resistances 266 and 278. This family of curves may vary from a straight, horizontal line at zero velocity to the curve illustrated. In this regard, the resistance 266 may be made variable to compensate for high values in the resistance 278. Thus, instead of always obtaining a maximum velocity in the motor 292 when the motor 294 is not moved, as when the tracer arm is in its central position, this movement of the motor 292 can be reduced to any desired speed by varying the resistance 278. It is also to be noted that the feed rate of the motor 294 can also be varied by varying resistances 280 and 268 in a similar manner.

It can, thus, be seen that there has been provided by the present invention a hydraulic circuit which includes a piloted balance valve operable to control a hydraulic motor. It will be understood that fluid devices, other than hydraulic motors, can be controlled by the balance valve and that the balance valve may be piloted by means other than a tracer vlave circuit. With the present invention the balance valve may be made responsive to any variable fluid pressure condition by connecting the same with such condition in the same manner as the tracer circuit is connected therewith.

It thus will be seen that the objects of this invention have been fully and effectively accomplished. It will be realized, however, that the foregoing specific embodiments have been shown and described only for the purpose of illustrating the principles of this invention and are subject to exetnsive change without departure from such principles. Therefore, this invention includes all modifications encompassed within the spirit and scope of the following claims.

We claim:

1. In a hydraulic system, a source of fluid under pressure, a fluid motor connected with said source, balance valve means for controlling the movement of said fluid motor, fluid resistance means connected in series with said balance valve means, said series connected means being connected with said motor, said valve having a body and a spool movable therein, said body having a port connected in series with said resistance and with said motor, a land on said spool arranged to variably restrict said port, said spool defining a pressure area, and pilot means connected with said pressure area for applying variable fluid pressure thereto so as to effect movement of said spool and hence control the fluid flow through said motor by varying the restriction by said port by said land, said pilot means including a tracer valve and a second fluid resistance connected in series with said tracer valve, said pressure area being connected to the high pressure side of said second fluid resistance.

2. In a hydraulic system as defined in claim 1, said spool defining a second pressure area opposed to said first mentioned pressure area and connected to the high pressure side of said first mentioned resistance.

3. In a hydraulic system as defined in claim 1, said spool defining a second pressure area opposed to said first mentioned pressure area, said second pressure area being connected with the low pressure side of said second fluid resistance and to the high pressure side of said tracer valve.

4. In a hydraulic system as defined in claim 1, said spool further defining third and fourth pressure areas opposed to each other, the third pressure area being opposed to said first mentioned pressure area and conncected with the high pressure side of said first mentioned resistance, the fourth pressure area being connected with the low pressure side of said first mentioned resistance.

5. In a hydraulic system, a source of fluid under pressure, a valve having a sliding spool defining a pressure area, said valve also having a port, a land on said sliding spool cooperating with said port to variably restrict flow therethrough, a motor and fluid resistance both connected in series with said fluid pressure source and said port, said fluid resistance also being connected to said hydraulic pressure area, said hydraulic pressure area exerting force tending to move said spool in a direction which closes said port, and pilot means exerting a force against said spool tending to open said port whereby the flow through said port is controlled.

6. In a hydraulic system, a source of fluid under pressure, a valve having a valve body and a movable spool, said valve body having a port therein, a land on said valve spool cooperating with said port so that said land variably restricts said port and movement of said spool relative to said body changes the amount said land restricts said port, an area on said spool adapted to be acted upon by fluid pressure and arranged in such a manner that fluid pressure acting on said area tends to increase the restriction of said port by said land, pilot means for providing force against said spool in a direction which tends to decrease the amount said land restricts said port, a fluid resistance connected in series with said port and said fluid pressure source, one end of said resistance being connected to supply fluid under pressure to act upon said area so that the flow through said port is controlled.

7. The hydraulic system of claim 6 wherein said means adapted to provide force against said spool in a direction which tends to decrease the amount said land restricts said port is an area on said spool arranged to be acted on by fluid pressure.

8. The hydraulic system of claim 7 wherein the other end of said resistance is connected to cause fluid pressure to act on the area which causes said spool to move in a direction wherein said land decreases the restriction of said port.

9. In a hydraulic system, a source of fluid pressure, a valve having a movable spool and a body, said body having a port therein, a land on said spool arranged to variably restrict said port, an area on said valve spool arranged to be acted on by fluid pressure to cause increase of the restriction of said port, a motor and a fluid resistance connected in series with said fluid pressure source and said valve port, said resistance being connected to supply fluid pressure to act on said area; a second fluid pressure source, a second area on said valve spool arranged to be acted on by fluid under pressure to urge said spool in a direction to cause decrease of the restriction of said port, a fluid resistance connected to said second fluid pressure source so as to permit fluid pressure to act on said second area whereby the fluid pressures acting on said two areas control the restriction of said port.

10. The hydraulic system of claim 9 wherein the fluid resistance connected to said second fluid pressure source is variable.

11. In a hydraulic system a valve having a body and a spool, said body having a port therein, a land on said spool arranged to variably restrict said port, first and second areas on said spool arranged to be acted on by fluid under pressure to cause forces which tend respectively to increase and decrease the restriction of said port by said land, a first fluid pressure source, a motor, and a first fluid resistance connected in series so as to supply fluid to act on said first area, and a second fluid pressure source, a second fluid resistance and a variable fluid resistance connected in series so as to supply fluid under pressure to said second area whereby the resistance to flow through said port is varied.

12. In a hydraulic system, a valve having a body and a movable spool, said body having a port therein, a land on said spool arranged to variably restrict said port, an area on said spool arranged to be acted upon by fluid under pressure to urge said land to increase resistance to flow through said port, pilot means urging said spool to decrease restriction to flow through said port by said land, a source of fluid under pressure, a first fluid resistance having two ends connected on one end to said fluid source, a fluid motor, said first fluid resistance being connected on its other end to said motor to urge said motor in one direction, means to urge said motor in another direction, a second fluid resistance, said second fluid resistance being connected in series with said port and the other end of said first fluid resistance, whereby said motor is controlled.

13. The hydraulic system of claim 12 wherein said pilot means to urge said spool in a direction to decrease the resistance to fluid flow through said port is hydraulic means, and the means to urge said motor in another direction is hydraulic means.

14. In a hydraulic system, a source of fluid under pressure, a fluid motor connected with said source, fluid resistance means, variable flow restricting means connected in series with said resistance means, said series connected being connected with said motor for controlling the movement of said motor, pressure responsive means for varying said flow restricting means, and pilot means for applying variable fluid pressure force acting upon said variable flow restricting means in opposition to said pressure responsive means, said pilot means including a tracer valve and a second fluid resistance and said pressure responsive means connected in series.

References Cited in the file of this patent

UNITED STATES PATENTS

| | | |
|---|---|---|
| 1,719,673 | Wettstein | June 25, 1929 |
| 1,912,184 | Ferris et al. | May 30, 1933 |
| 1,938,758 | Ernst | Dec. 12, 1933 |
| 1,943,061 | Douglas | Jan. 9, 1934 |
| 1,952,690 | Strom | Mar. 27, 1934 |
| 1,983,385 | McLaughlin | Dec. 4, 1934 |
| 1,999,834 | Ernst | Apr. 30, 1935 |
| 2,003,557 | Sassen | June 4, 1935 |
| 2,069,122 | Weaver | Jan. 26, 1937 |
| 2,675,652 | Chiappalini | Apr. 20, 1954 |
| 2,702,685 | Capsek | Feb. 22, 1955 |
| 2,711,113 | Audemar | June 21, 1955 |
| 2,802,456 | Lance | Aug. 13, 1957 |